United States Patent [19]

Suzuki et al.

[11] Patent Number: 4,528,279
[45] Date of Patent: Jul. 9, 1985

[54] MONOLITHIC CATALYST FOR EXHAUST GAS PURIFICATION

[75] Inventors: Yoshihiro Suzuki; Hiroo Kinoshita, both of Toyota; Masayasu Sato; Masanori Ohara, both of Shizuoka, all of Japan

[73] Assignees: Toyota Jidosha Kogyo Kabushiki Kaisha, Aichi; Cataler Industrial Co. Ltd., Shizuoka, both of Japan

[21] Appl. No.: 592,740

[22] Filed: Mar. 23, 1984

Related U.S. Application Data

[63] Continuation of Ser. No. 354,659, Mar. 4, 1982, abandoned, which is a continuation of Ser. No. 247,007, Mar. 24, 1981, abandoned.

[30] Foreign Application Priority Data

Nov. 20, 1980 [JP]  Japan ................................. 55-163727

[51] Int. Cl.$^3$ ........................ B01J 21/04; B01J 23/10; B01J 23/42; B01J 23/46
[52] U.S. Cl. ................................... 502/200; 502/252; 502/262; 502/303; 423/213.5
[58] Field of Search ............... 502/303, 200, 252, 262; 423/213.5

[56] References Cited

U.S. PATENT DOCUMENTS

| | | | |
|---|---|---|---|
| 3,776,859 | 12/1973 | Simpson | 502/302 |
| 3,883,444 | 5/1975 | Maselli et al. | 502/332 X |
| 4,170,573 | 10/1979 | Ernest et al. | 502/303 |
| 4,183,829 | 1/1980 | Adachi et al. | 502/328 |
| 4,274,981 | 6/1981 | Suzuki et al. | 502/304 X |

Primary Examiner—W. J. Shine
Attorney, Agent, or Firm—Oblon, Fisher, Spivak, McClelland & Maier

[57] ABSTRACT

A monolithic catalyst, for the purification of exhaust gases from an internal combustion engine, comprising: an inert carrier; a film of alumina and rare earth oxides coated onto the surface of said inert carrier, wherein Ce and La are present in said film at an atomic ratio of Ce/La of 0.05–0.3 and the total content of rare earth oxides in said film is 2–50 wt. %, measured as $R_2O_3$, wherein R is an element of the lanthanide series of the Periodic Table; and said film carries a catalyst component containing at least one element of the platinum family.

5 Claims, 1 Drawing Figure

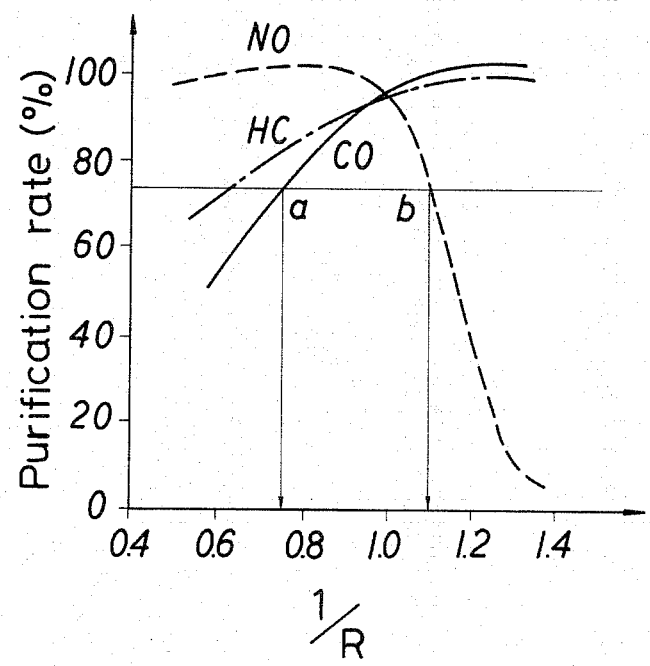

MONOLITHIC CATALYST FOR EXHAUST GAS PURIFICATION

This application is a continuation of application Ser. No. 354,659, filed Mar. 4, 1982, now abandoned, which is a continuation of Ser. No. 247,007 filed Mar. 24, 1981, now abandoned.

BACKGROUND OF THE INVENTION

1. Field of the Invention

The present invention relates to a catalyst, for rendering the harmful components of exhaust gases harmless and eliminating them, and a manufacturing process thereof. More specifically, the present invention relates to a monolithic catalyst coated with a film of active alumina and oxides of rare earth elements for the purpose of rendering the harmful components of exhaust gases from internal combustion engines, i.e., CO, HC and $NO_x$ harmless, and a manufacturing process thereof.

2. Description of the Prior Art

As is well-known, a monolithic carrier, particularly the so-called honeycomb carrier having a number of fluid paths each partitioned by thin walls, is characterized in that is possesses a low resistance to the passage of exhaust gas on account of its high porosity; it possesses a good warm-up property on account of less heat dissipation from its casing than in the case of a granular catalyst; and it suffers little physical water for structural reasons. These features makes this carrier suitable for a catalyst to purify the exhaust gas from an internal combustion engine which is exposed to heavy vibrations and exhaust pulsations. However, such a monolithic carrier is usually fabricated of an inorganic refractory material such as cordierite, mullite, α-alumina, silicon nitride or a heat-resistant metal to make it resistant to the high heat of exhaust gas; and such a refractory carrier which carries a catalyst on its surface usually cannot exhibit those properties which are practically required.

The reason for this is that the refractory material to constitute the monolithic carrier is treated at a relatively high heat to develop the required strength; and, in consequence, the specific surface area diminishes, which results in a decreased diffusibility of the catalyst metal into the carrier.

Meanwhile, a commonly used granular carrier to carry a catalyst for exhaust gas purification is mainly composed of active alumina and by virtue of its large specific surface area and appropriate distribution of its pores it is free from the drawbacks of the monolithic carrier. However, it has defects not known in the monolithic carrier such as wear through mechanical vibration, because it is granular, and poor warm-up property, because it is charged into a casing with high thermal capacity.

As disclosed in U.S. Pat. No. 3,565,830, it is known to coat the monolithic carrier with a film of a catalytically effective active alumina, thereby reforming it into a catalyst carrier with higher catalytic activity and/or higher durability; and the relevant technique of coating is also disclosed in the related literature.

Additionally, Japanese Patent Application Laid Open No. 14600/1973 teaches a method of preventing alumina transfer due to high heat through addition of an oxide of rare earth metal to active alumina.

As known from British Patent Specification No. 950235, alumina-copper oxide-oxide of rare earth element is effective as an application of an oxide of rare earth element as a catalyst for purification of exhaust gas from the internal combustion engine.

These conventional methods, however, cannot fully meet the practical requirements for catalyst function.

For instance, even when following the Japanese Patent Application Laid Open No. 14600/1973, if an oxide of a rare earth element is simply added for stability to alumina, the catalytic component will not be successfully stabilized. When a cerium oxide alone is added, the performance of the catalyst in purifying HC's will rather deteriorate.

If a mixture of oxides of rare earth elements is employed, the coating strength will drop or the ion adsorption capacity will drop when the catalytic component is carried with the use of an aqueous solution of salts of platinum group metals. Thus, a satisfactory performance of the catalyst cannot be expected.

The stability of alumina can well be attained even when less than 2 weight % of an oxide of rare earth element is added to alumina; but the effect of a cerium oxide or a lanthanum oxide to promote the catalytic reaction or improve the diffusibility of a carried precious metal salt will not be sufficient.

As for a catalyst of a base metal oxide such as a transition element oxide or a rear earth element oxide as disclosed in British Patent Specification No. 950235, it lacks durabilty and is unfit for practical use.

A need therefore continues to exist for a durable catalyst which can effectively purify the exhaust gases of an internal combustion engine, i.e., substantially eliminate CO, HC and $NO_x$.

SUMMARY OF THE INVENTION

Accordingly, one object of the invention is to provide a durable catalyst which can effectively purify the exhaust gases of an internal combustion engine.

A further object of the invention is to provide a process for manufacturing a durable catalyst which can effectively purify the exhaust gases of an internal combustion engine.

Briefly, these objects and other objects of the invention as hereinafter will become more readily apparent can be attained by providing a monolithic catalyst for the purification of exhaust gases comprising: an inert carrier; a film of alumina and rare earth oxides coated onto the surface of said inert carrier, wherein Ce and La are present in said film at an atomic ratio of Ce/La of 0.05 –0.3 and the total content of rare earth oxides in said film is 2-50 wt. %, measured as $R_2O_3$, wherein R is an element of the lanthanide series of the Periodic Table; and said film carries a catalyst component containing at least one element of the platinum family, i.e., Ru, Os, Rh, Ir, Pd and Pt.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

The FIG. 1 illustrates the purification rate of CO, HC and $NO_x$ with respect to 1/R, the ratio of the volume of oxygen in the oxidizing components of the exhaust that can be used for oxidizing reactions to the necessary volume of oxygen to convert reducing components of the exhaust to $H_2O$ and $CO_2$, in durability tests of an embodiment of the present invention.

DETAILED DESCRIPTION OF THE PREFERRED EMBODIMENTS

The effect of the addition of rare earth element oxides to active alumina can not be generalized; in the case of a precious metal catalyst for purification of exhaust gas from an internal combustion engine it is extremely notable that each rare earth element exhibits a specific performance. This point has been elucidated by the present inventors, leading to the invention of a practical, effective catalyst.

Cerium oxide excels in its ability to store oxygen and oxide CO. Lanthanum oxide is the most basic of all the rare earth compounds; when added to active alumina, it strongly adsorbs negative ions and allows high concentrations of precious metal ions to be carried on the topmost surface layer of the carrier in the formation of a catalyst.

The catalyst according to the present invention exhibits a prominent effect as the so-called three-way catalyst that can eliminate the three harmful components, i.e., CO, HC and $NO_X$, at the same time, and which is currently attracting increasing attention.

Generally speaking, the condition of the exhaust gas being rich in oxidizing elements is favourable to the elimination of CO and HC but under this condition the ability of the catalyst to reduce $NO_X$ heavily deteriorates. On the other hand, when the exhaust gas is rich in reducing elements, the condition is favourable for elimination of $NO_X$ but the ability of the catalyst to oxidize CO and HC remarkably drops. Thus the development of the so-called three-way catalyst that can effectively eliminate CO, HC and $NO_X$ at the same time has been desirable.

As understood from the above, it is desirable for the three-way catalyst to be able to render CO, HC and $NO_X$ harmless, simultaneously and effectively, when the value of 1/R is around 1.0; namely the oxidizing elements and the reducing elements are stoichiometrically equivalent in volume in the exhaust gas.

$$1/R = O_o/O_R$$

where
- $O_o$: the volume of oxygen in the oxidizing elements that can be used for oxidizing reactions, and
- $O_R$: the necessary volume of oxygen to convert all the reducing elements to $H_2O$ and $CO_2$.

The typical reducing elements to the exhaust gas are CO, $H_2$ and HC, while the typical oxidizing elements therein are $O_2$ and $NO_X$; additionally, there are neutral elements such as $CO_2$, $H_2O$ and $N_2$. These neutral elements have nothing to do with the calculation of 1/R.

The condition of $1/R < 1$, in which the reducing element is in excess over the oxidizing element is called "rich"; and the condition of $1/R > 1$, in which the oxidizing element is in excess over the reducing element is called "lean".

As stated above, to make the three-way catalyst effective work it is desirable that the value of 1/R be around 1.0. As a matter of fact, it is exceedingly difficult to control the exhaust gas at all time to $1/R = 1.0$ and unavoidably the catalyst has to work under more or less "rich" or "lean" conditions. Thus a catalyst with as high rate as possible of purifying CO and HC under "rich" condition and as a high rate as possible of purifying $NO_X$ under "lean" condition is demanded.

The so-called "window" is a characteristic which indicates the tolerable range of 1/R values in a three-way catalyst. Now suppose purification rates of more than 70% for $NO_X$, CO and HC are desired. Then in the three-way catalyst with the purifying performance shown in FIG. 1, the value of 1/R in the exhaust gas may fluctuate within the range of a-b in FIG. 1; and this range a-b is called a "window" for more than a 70% purification rate of $NO_X$, HC and CO. Therefore, a wide window is preferable; when the "window" is narrow, the value of 1/R has to be more strictly controlled and if it is still narrower, practical use will become impossible. For this reason, conventional CO- and HC-oxidizing catalysts and $NO_X$-reducing catalysts are respectively limited to "lean" use and "rich" use. To be applicable as a three-way catalyst, they have too narrow a window or totally lack a window.

An important requirement further imposed on the three-way catalyst is that the HC, CO and $NO_X$ purifying performance around $1/R = 1$ does not deteriorate during use and that the window does not narrow; in other words, the performance endures.

In many of the conventional three-way catalysts, Rh and other platinum group metals are combined. These catalysts have drawbacks, however, in that, in practical use around $1/R = 1$ their ability to purify $NO_X$, CO and HC steadily drops and, during long usage, the deterioration is remarkable; also, their window is not wide enough and it narrows during long useage.

The present invention aims at resolving these drawbacks of the prior art. Its main aim is to provide an exhaust gas purifying catalyst which is characterized in that the catalytic component is carried on a carrier coated with a film mainly composed of alumina with additions of lanthanum and cerium oxides. To be more specific, the catalyst according to the present invention is characterized in that an oxide film is formed on the carrier; the film is mainly composed of alumina and lanthanum and cerium oxides, i.e., additions of multiple oxide or mixed oxide—whereby the atomic ratio Ce/La is in the range of 0.05–0.3 and the volumes of the total rare earth element oxides as $R_2O_3$ (R denotes an element in the lanthanide group III b of the Periodic Table), are in the range of 2–50 weight %, preferably 5~35 weight %; and this oxide film carries at least one or more platinum group metals, i.e., Ru, Os, Rh, Ir, Pd and Pt, as catalytic components.

Oxides of rare earth elements occur in nature as mixed oxide having different bonding ratios of rare earth to oxygen, but in the measurement of weight % it is assumed for calculation that they occur universally in the form of trioxide, i.e., $R_2O_3$.

The atomic ratio Ce/La in the oxide film is in the range of 0.05–0.3. When the ratio is less than 0.05, justice is not done to the excellent ability of Ce to store oxygen and purify CO; when the ratio is in excess of 0.3, its ability to purify HC drops.

When the atomic ratio Ce/La is in the range of 0.05–0.3 as specified in the present invention, a prominant effect, which cannot be gained through single addition of Ce or La, of enlarging the window or elevating the $NO_X$ purifying ability emerges.

Rare earth oxides, whose positive ion diameter is about two times that of the aluminum ion, are not likely to form a solid solution in alumina. X-ray diffraction analysis of a coating film containing Ce and La oxides reveals, however, a shifting of the diffraction line of the (III) face of Ce dioxide, from which it is surmised that a partial solid solution or a compound oxide has been formed. It should be noted that this analysis also reveals diffraction patterns of Ca or LA oxide alone; and since it makes no great difference whether Ce oxide and La oxide are present in the form of a compound oxide or a mixture, the present invention is not affected by this fact.

Generally, speaking, rare earth compounds are hard to separate into the respective elements and unavoidably they contain a small volume of other rare earth elements, e.g., Nd, Pr, Sm, Y, Eu; and trace impurities, e.g., $SiO_2$, $Fe_2O_3$. However, the presence of these elements does not pose any difficulty in the execution of the present invention.

As for the volume of the total rare earth oxides including Ce and La oxides, less than 2% by weight will merely bring about the effect of preventing a contraction of the alumina, and hardly any effect of improving the catalyst performance. When the volume of the total rare earth oxides accounts for over 50% by weight of the total components in the coating film, a large drop in the purifying performance is caused, defeating the intended purpose. Thus it is preferable that said volume of the total rare earth oxides in said film is 5–35% by weight.

Further, the sum of Ce and La oxides is preferably greater than 90% by weight of the total rare earth oxides.

A porous inorganic oxide carrier or a heat-resistant metal carrier available in the present invention which is to be coated with an oxide film may be made of a refractory material such as cordierite, mullite, alpha-alumina, silicon nitride, magnesia, zirconia; or a heat-resistant metal, say, ferrite alloy or ferrite alloy containing aluminum; and it is constructed such that a large number of fine gas paths (hereinafter to be called cells) internally partitioned by thin walls run from the entrance to the exit at the opposite end, i.e., the so-called honeycomb structure.

Fine powder of active alumina available as the main component of the coating film is one or a mixture of two or more of the following substances: amorphous alumina gel, gamma-alumina, chi-alumina, delta-alumina, eta-alumina, kappa-alumina and theta-alumina. The specific surface area of the active alumina is 10–300 $m^2/g$, preferably 30–150 $m^2/g$; and the mean particle size should be less than $30\mu$. If it exceeds $30\mu$, sedimentation in a slurry will be large, making the material unfit for use in fabrication of the catalyst.

As the source of La and Ce, the following are available: their oxides, hydroxides, fluroides, chlorides, acetates, oxalates, sulfates, nitrates, carbonates, ammonium sulfate salt, ammonium nitrate salt, etc. When these material are employed to form the coating film the slurry can be mixed if necessary, with a binder such as colloidal boehmite, an amorphous alumina sol, aluminum nitrate or aluminum polychloride, mainly composed of alumina, in case the strippability or bondability of the film is in question.

Further, the addition of non-ionic surface active agents or fine powders of a resin to the slurry will be effective to increase the porosity of the coating film. The available non-ionic surface active agents are for instance: a block copolymer of ethylene oxide and propylene oxide; or polyoxyethylene-2-phenolether. The available resin powders are for instance: polyethylene powder or polypropylene powder. Additions of these materials are variable, the desirable amount being 0.005–10 weight % for the non-ionic surface active agent and 0.1–60 weight % for the resin powder.

The available platinum family metal salts for the catalytic component are the standard ones ordinarily employed: namely, chlorides, nitrates, chloro-metal acids, ammonia complexes, nitroamino complexes. The method of carrying the catalytic component and the volume of the catalytic components carried are those conventionally used in the art. The available metals of the platinum family are Pd, Pt, Rh, Ir, Ru and Os.

Having generally described this invention, a further understanding can be obtained by reference to certain specific examples which are provided herein for purposes of illustration only and are not intended to be limiting unless otherwise specified.

Examples 1–7 illustrate the present invention. Controls 1–7 are given for comparison with the present invention. Tests 1 and 2 show the results of testing the performances of these various catalytic materials.

EXAMPLE 1

26.5 g of $La(NO_3)_3.6H_2O$, 6.3 g of $Ce(NO_3)_3.6H_2O$, and 207.5 g of $Al(NO_3)_3.9H_2O$ were dissolved in 427.5 ml of water; the resulting solution was added slowly under agitation with 472.5 g of active alumina powder of specific surface area 95 $m^2/g$ and mean particle size $9.7\mu$ to prepare a coating suspension.

Next, a commercial cordierite honeycomb carrier, which had been immersed in distilled water, was lifted out of the water and the water within the cells of the carrier was blasted away by an air stream.

The carrier employed was a cylinder 40 mm in diameter and 50 mm long with square cells of wall thickness about 0.3 mm running at a rate of 300 cells/$in^2$ (about 47 cells/$cm^2$) in longitudinal parallel directions.

The coating suspension was allowed to flow into this carrier and then the excess of the suspension filling the cells was blasted away by compressed air of surge pressure 0.5 kg/$cm^2$; the same operation was repeated in a reverse direction to evacuate all the cells. Hot air of 80° C., for drying, was blasted for 30 minutes into the wet carrier paths, after the coating; followed by one hour blasting of a hot air of 230° C.; then the carrier was put in an electric furnace and heated to 700° C. in 2 hours, followed by one hour of firing at this temperature; and thereafter it was gradually cooled and taken out of the furnace.

The above cycle was repeated twice to produce a coating on the carrier equal to about 10 g/piece.

The specific surface area of the coated film as measured by the BET method was 89 $m^2/g$.

The catalyst carrier thus obtained was immersed for 30 minutes in a flow of 126 ml of aqueous solution of chloroplatinic acid containing 478 mg/l of Pt; lifted out of the flow; the liquid drops in the cells were driven out by an air stream, followed by a quick drying in a hot air stream of 150° C.; and thereafter subjected to 3 hours of reduction in a nitrogen gas atmosphere containing 5% hydrogen at 500° C. Further the carrier was immersed for 30 minutes in a flow of 126 ml of aqueous solution of Rh chloride containing Rh 51 mg/l; lifted out of the solution; the liquid drops in the cells were driven out by an air stream; dried for 3 hours at 150° C. and then two hours of firing at 500° C. ensued.

In the whole weight of the catalyst, 0.12% by weight was Pt and 0.013% by weight Rh. In the coated film of the finished catalyst, the weight of the total rare earth oxides amounted to 2.5% of the coating, while the atomic ratio Ce/La was 0.235.

EXAMPLE 2a TO 7

The volumes of lanthanum nitrate, cerium nitrate, active alumina powder and water were changed, otherwise the same process as in Example 1 was adopted to produce the catalysts as listed in Table 1 by forming a coating film on the carrier and carrying Pt and Rh on the carrier. The weight of the total rare earth oxides in the coating film of the produced catalysts and the atomic ratio Ce/La are also given in Table 1.

TABLE 1

| Example No. | Content of total rare earth oxides in coating film (weight %) | Ce/La atomic ratio | Pt/Rh carried volume (weight %) |
|---|---|---|---|
| 1 | 2.5 | 0.235 | 0.12/0.013 |
| 2a | 7.7 | 0.095 | 0.12/0.013 |
| 3 | 17.5 | 0.125 | 0.11/0.012 |
| 4 | 25.0 | 0.235 | 0.11/0.011 |
| 5 | 35.0 | 0.160 | 0.10/0.011 |
| 6a | 45.0 | 0.270 | 0.09/0.010 |
| 7 | 38.5 | 0.095 | 0.10/0.010 |

EXAMPLES 2b AND 6b

Carriers with a coating film of the same composition as in Examples 2a and 6a were immersed for 30 minutes in 126 ml of aqueous solutions of chloroplatinic acid containing respectively 530 mg/l and 583 mg/l of Pt; lifted out of the solutions; removed of liquid drops in the cells by blasting with an air stream; and quick-dried in hot air at 150° C., followed by 3 hours of reduction in a nitrogen gas at 500° C. with 5% hydrogen content.

The compositions of the produced catalysts are listed in Table 2.

EXAMPLES 2c AND 6c

Carriers with a coating film of the same composition as in Examples 2a and 6a were immersed for one hour in flows of 126 ml of aqueous solutions of palladium chloride respectively containing 505 mg/l and 526 mg/l of palladium; lifted out of the solutions; removed of liquid drops in the cells by blasting with an air stream and quick-dried in hot air at 200° C., followed by 3 hours of reduction in a nitrogen gas at 500° C. with 5% hydrogen content.

The compositions of the produced catalysts are listed in Table 2.

EXAMPLES 2d AND 6d

Instead of the aqueous solutions of chloroplatinic acid, mixtures of aqueous solutions of chloroplatinic acid and palladium chloride containing respectively Pt/Pd, 265/252 mg/l and 292/263 mg/l were employed, otherwise the same process as in Examples 2b and 6b was adopted to produce catalysts as listed in Table 2.

TABLE 2

| Example No. | Content of total rare earth oxides in coating film (weight %) | Ce/La atomic ratio | Carried metal | Carried volume (weight %) |
|---|---|---|---|---|
| 2b | 7.7 | 0.095 | Pt | 0.13 |
| 2c | 7.7 | 0.095 | Pd | 0.13 |
| 2d | 7.7 | 0.095 | Pt/Pd | 0.06/0.06 |
| 6b | 45.0 | 0.270 | Pt | 0.11 |
| 6c | 45.0 | 0.270 | Pd | 0.12 |
| 6d | 45.0 | 0.270 | Pt/Pd | 0.05/0.06 |

Control 1

According to the process in Example 1, catalyst carrier with a coating film containing neither Ce nor La is prepared. Namely, the coating film was formed using a mixture of aluminum nitrate, active alumina poowder and water without addition of cerium nitrate and lanthanum nitrate in the preparation of the coating suspension and then Pt and Rh were carried, thereby yielding a catalyst as listed in Table 3.

Control 2

A catalyst carrier with no lanthanum content in the coating film was prepared. Namely lanthanum nitrate was not added and the volumes of Ce nitrate, active alumina powder and water were changed, otherwise the same process as in Example 1 was employed to produce a catalyst as listed in Table 3.

Control 3

A catalyst carrier with no Ce content in the coating film was prepared. Namely cerium nitrate was not added and the volumes of lanthanum nitrate, active alumina powder and water were changed, otherwise the same process as in Example 1 was employed to produce a catalyst as listed in Table 3.

Controls 4a~7a

The volumes of cerium nitrate, lanthanum nitrate, active alumina powder and water were changed, otherwise the same process as in Example 1 was employed to produce catalysts. The content of the total rare earth oxides in the coating film of the produced catalysts and the atomic ratio Ce/La were as listed in Table 3.

TABLE 3

| Control | Content of total rare earth oxides in coating film (weight %) | Ce/La atomic ratio | Pt/Rh carried volume (weight %) |
|---|---|---|---|
| 1 | 0 | — | 0.12/0.013 |
| 2 | 25.0 | Ce alone | 0.11/0.012 |
| 3 | 25.0 | La alone | 0.11/0.011 |
| 4a | 1.3 | 0.284 | 0.12/0.013 |
| 5 | 6.0 | 0.473 | 0.12/0.013 |
| 6 | 40.7 | 0.017 | 0.10/0.011 |
| 7a | 60.5 | 0.095 | 0.10/0.011 |

Controls 4b AND 7b

Carriers with a coating film of the same composition as in controls 4a and 7a and aqueous solutions of chloroplatinic acid respectively containing 530 mg/l and 632 mg/l of Pt were used, otherwise the same process as in Examples 2b and 6b was employed to produce catalysts as listed in Table 4.

Controls 4c AND 7c

Carriers with a coating film of the same composition as in controls 4a and 7a and aqueous solutions of palladium chloride respectively containing 505 mg/l and 568.2 mg/l of Pd were used, otherwise the same process as in Examples 2c and 6c was employed to produce catalysts as listed in Table 4.

Controls 4d AND 7d

Carriers with a coating film of the same composition as in controls 4a and 7a and mixtures of aqueous solutions of chloroplatinic acid and palladium chloride respectively containing Pt/Pd, 265/252 mg/l and 316/284 mg/l were used, otherwise the same process as in Examples 2d and 6d was employed to produce catalysts as listed in Table 4.

TABLE 4

| Control | Content of total rare earth oxides in coating film (weight %) | Ce/La atomic ratio | Carried metal | Carried volume (weight %) |
|---|---|---|---|---|
| 4b | 1.3 | 0.284 | Pt | 0.13 |
| 4c | 1.3 | 0.284 | Pd | 0.13 |
| 4d | 1.3 | 0.284 | Pt/Pd | 0.06/0.06 |
| 7b | 60.5 | 0.095 | Pt | 0.12 |
| 7c | 60.5 | 0.095 | Pd | 0.12 |
| 7d | 60.5 | 0.095 | Pt/Pd | 0.06/0.06 |

Test 1

The catalysts obtained in Examples 1–7 and Controls 1–7 were submitted to 200 hours of endurance testing in the exhaust gas from a 4-cylinder 2l-displacement engine, in which the values of 1/R controlled to 1/R = 1.0 practically fluctuate between $1/R \geqq 1$ and $1/R \leqq 1$, the catalyst bed temperature thereby being about 720° C. and the spatial velocity about 50,000 $Hr^{-1}$.

Further they were submitted to model gas activity evaluation test (hereafter called model gas evaluation A) for the purpose of evaluating the catalyst activity.

In the model gas evaluation A the model gas contains CO 2.5–0.5%; NO 500–2500 ppm; $C_3H_6$ 1200–700 ppm as HC; $O_2$ 0.2–1.2%; $H_2$ 0.8–0.15%; $H_2O$ about 10%; $CO_2$ 7.5–10%, the balance being $N_2$. Using this as a stationary gas with 1/R adjusted to 0.4–2.0, a variable gas with excess $O_2$ 1–1.5% or excess CO 2–3%, alternately introduced at ½ Hz, was heated to about 500° C. and sent to the catalyst at a spatial velocity of about 30,000 $Hr^{-1}$, whereby the purifying rates of HC, CO and NO were measured, yielding the diagram illustrated in FIG. 1. From this diagram was read Δ1/R, indicating more than 70% purification of NO, HC and CO and therefrom the window width (the width a-b in FIG. 1) was found. Further from the NO, HC, CO purifying rates at the value of 1/R of the stationary gas before alternate introduction of $O_2$ and CO, particularly at its value set around 1, the catalyst activity was evaluated.

In this evaluation, at the laboratory, the values of 1/R were taken for the stationary gas before alternate introduction of $O_2$ and CO; they are not the mean values after alternate introduction of $O_2$ and CO. Therefore the window width is also based on these values of 1/R. It goes without saying that the higher the values of Δ1/R and NO, CO, HC purifying rates, the better the catalyst.

The results of model gas evaluation A for the catalysts as produced in Examples 1–7 and Controls 1–7 (fresh) and for the specimens submitted to the endurance test (used) are summarized in Table 5.

Typical curves for HC, CO, NO purifying rates vs. 1/R values varied 0.4–2.0 of the stationary gas are illustrated in FIG. 1 for the specimens after endurance test in Example 1.

TABLE 5

| | Fresh | | | | Used | | | |
|---|---|---|---|---|---|---|---|---|
| | HC | CO | NO | Window (Δ1/R) | HC | CO | NO | Window (Δ1/R) |
| | (Examples) | | | | | | | |
| 1 | 96 | 98 | 91 | 0.44 | 89 | 91 | 84 | 0.28 |
| 2a | 97 | 98 | 92 | 0.44 | 93 | 94 | 90 | 0.36 |
| 3 | 98 | 98 | 93 | 0.45 | 95 | 95 | 91 | 0.39 |
| 4 | 97 | 98 | 92 | 0.47 | 94 | 94 | 92 | 0.42 |
| 5 | 98 | 98 | 93 | 0.47 | 93 | 94 | 90 | 0.36 |
| 6a | 96 | 97 | 91 | 0.42 | 90 | 92 | 88 | 0.33 |
| 7 | 97 | 98 | 92 | 0.41 | 88 | 90 | 84 | 0.28 |
| | (Controls) | | | | | | | |
| 1 | 94 | 97 | 89 | 0.22 | 76 | 80 | 75 | 0.05 |
| 2 | 96 | 98 | 90 | 0.35 | 83 | 87 | 82 | 0.18 |
| 3 | 95 | 95 | 90 | 0.28 | 81 | 86 | 79 | 0.10 |
| 4a | 95 | 97 | 90 | 0.24 | 81 | 83 | 81 | 0.19 |
| 5 | 96 | 98 | 91 | 0.30 | 75 | 85 | 81 | 0.21 |
| 6 | 95 | 98 | 89 | 0.26 | 83 | 85 | 81 | 0.19 |
| 7a | 93 | 95 | 88 | 0.32 | 81 | 83 | 79 | 0.17 |

It is seen from the results summarized in Table 5 that the catalysts according to the present invention in Examples 1–7 are superior in both the window width and HC, CO, NO purifying rates before and after endurance test as compared to the ones in Controls 1–7.

Especially, the superiority in the window width and the purification rate after the endurance test is prominent, testifying to the excellence in durability. Control 2 with addition to Ce alone and control 3 with addition of La alone are found superior to control 1 with no addition of Ce, but even they are inferior to the catalyst according to the present invention.

Test 2

The catalysts obtained in Examples 2b–2d, 6b–6d and in Controls 4b–4d, 7b–7d were submitted to 200 hours of endurance testing at a constant velocity of 120 Km/h in the exhaust gas of a 4-cylinder 2l-displacement engine with air/fuel ratio (AF) controlled to about A/F = 16, the catalyst bed temperature thereby being about 800° C. and the spatial velocity about 50,000 $Hr^{-1}$.

Further they were submitted to model gas evaluation B for evaluation of the catalyst activity. In this evaluation, a model gas with CO 1%, $NO_x$ 1,000 ppm, $C_3H_6$ 800 ppm and $C_3H_8$ 200 ppm as HC, $O_2$ 2%, $H_2O$ about 10%, $CO_2$ 10% and $N_2$ the balance was heated to 400° C. and sent to the catalyst at a spatial velocity of about 50,000 $Hr^{-1}$ for measurement of the CO, HC purifying rates, thereby evaluating the catalyst activity. The results of model gas evaluation B for the catalysts obtained in Examples 2b–2d, 6b–6d and in Controls 4b–4d, 7b–7d (fresh) and the specimens submitted to endurance test (used) are summarized in Table 6.

TABLE 6

| | Fresh | | Used | |
|---|---|---|---|---|
| | HC | CO | HC | CO |
| | (Examples) | | | |
| 2b | 84 | 94 | 76 | 88 |
| c | 85 | 94 | 78 | 90 |
| d | 86 | 95 | 80 | 91 |
| 6b | 86 | 94 | 77 | 90 |
| c | 87 | 95 | 77 | 91 |
| d | 87 | 95 | 78 | 92 |
| | (Controls) | | | |
| 4b | 80 | 93 | 58 | 64 |
| c | 81 | 93 | 58 | 64 |
| d | 81 | 94 | 59 | 65 |
| 7b | 81 | 90 | 53 | 60 |
| c | 81 | 91 | 54 | 60 |

TABLE 6-continued

| | Fresh | | Used | |
|---|---|---|---|---|
| | HC | CO | HC | CO |
| d | 82 | 92 | 54 | 61 |

From the data in Table 6, it is seen that the catalysts according to the present invention in Examples 2b-2d and 6b-6d excel over the ones in Controls 4b-4d and 7b-7d.

The excellence in the purifying rates after 200 hours of endurance testing (equivalent to 24,000 Km run) is particularly prominent, testifying to the superiority in durability of the catalyst of this invention.

Having now fully described this invention, it will be apparent to one or ordinary skill in the art that many changes and modifications can be made thereto without departing from the spirit or scope of the invention set forth herein.

What is claimed as new and desired to be secured by Letters Patent of the United States is:

1. A monolithic catalyst, for the purification of exhaust gases from an internal combustion engine, comprising: an inert carrier; a film of alumina and rare earth oxides coated onto the surface of said inert carrier, wherein Ce and La are present in said film at an atomic ratio of Ce/La of 0.05-0.3:1, the total content of rare earth oxides in said film is 17.5-50 wt%, measured as $R_2O_3$, wherein R is an element of the lanthanide series of the Periodic Table, and Ce and La oxides are present in said film in an amount of greater than 90% by weight of the total rare earth oxides; and said film carries a catalyst component containing platinum and rhodium.

2. The monolithic catalyst according to claim 1, wherein the inert carrier is selected from the group consisting of cordierite, mullite, alpha-alumina, silicon nitride, magnesia and zirconia.

3. The monolithic catalyst according to claim 1, wherein said alumina is selected from the group consisting of amorphous alumina gel, gamma-alumina chi-alumina, delta-alumina, ata-alumina, kappa-alumina and theta-alumina.

4. The monolithic catalyst according to claim 1, wherein the specific surface area of said alumina is 10-300 m²/g and the average particle size of said alumina is less than 30μ.

5. The monolithic catalyst according to claim 4, wherein the specific surface area of said alumina is 30-150 m²/g.

* * * * *